UNITED STATES PATENT OFFICE.

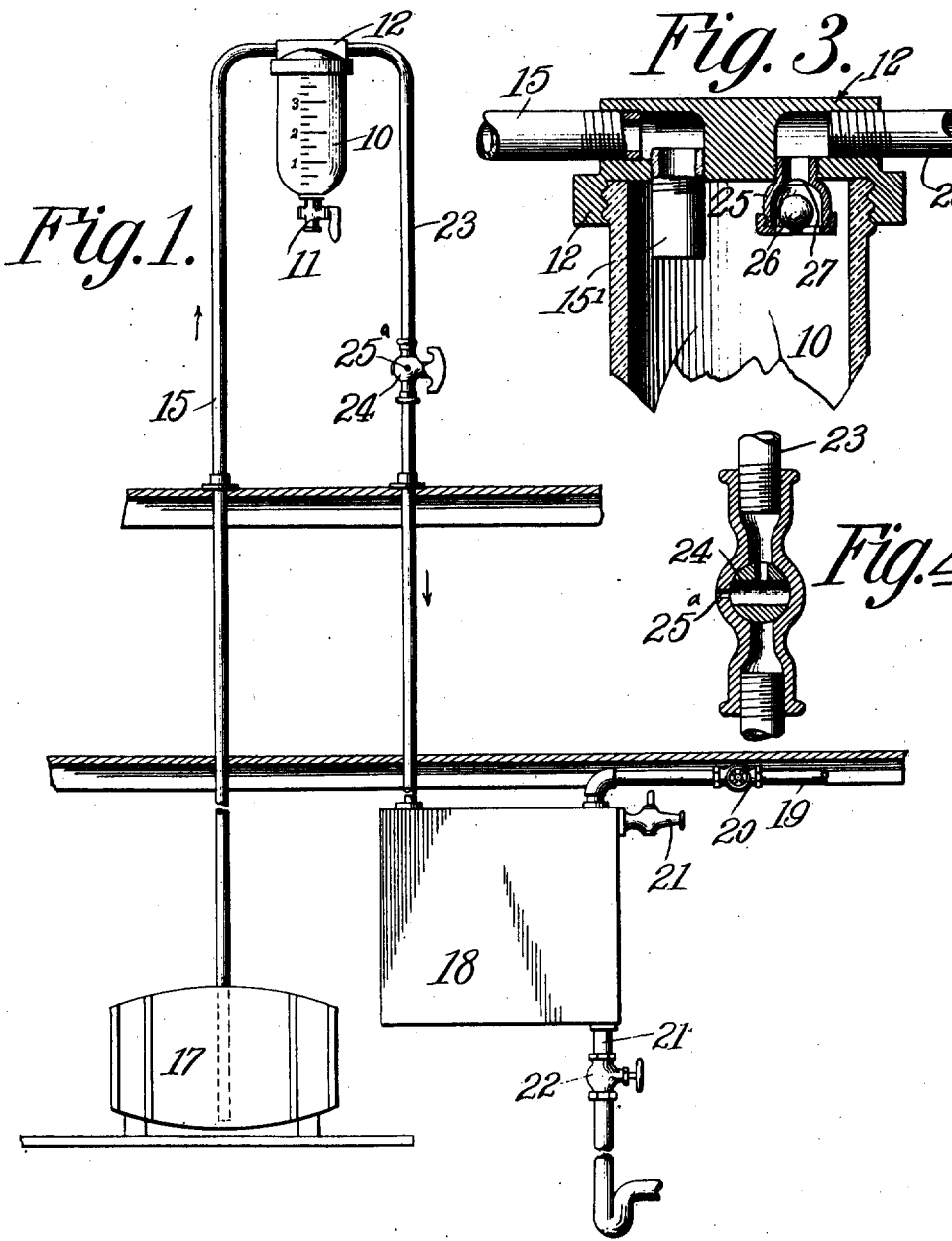

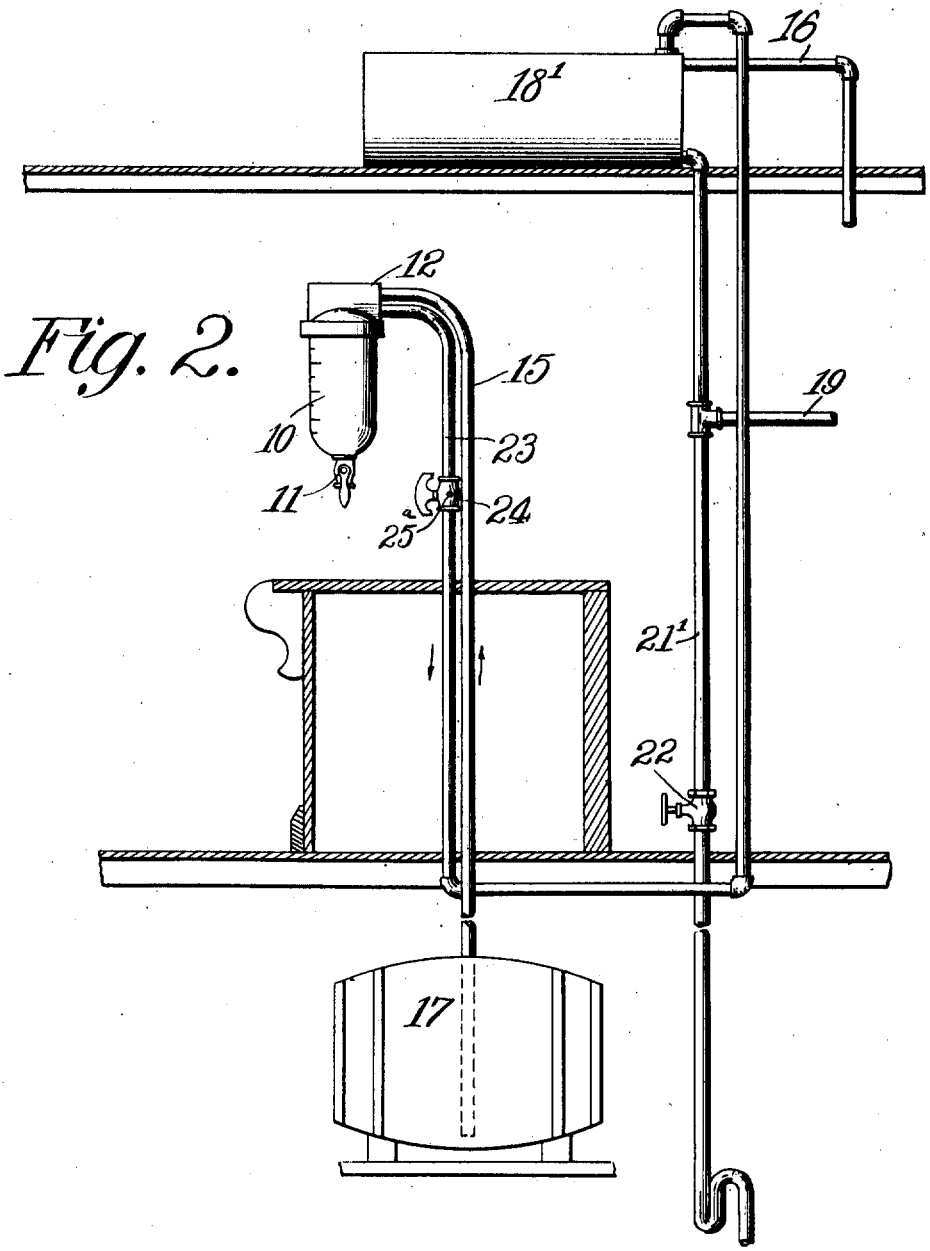

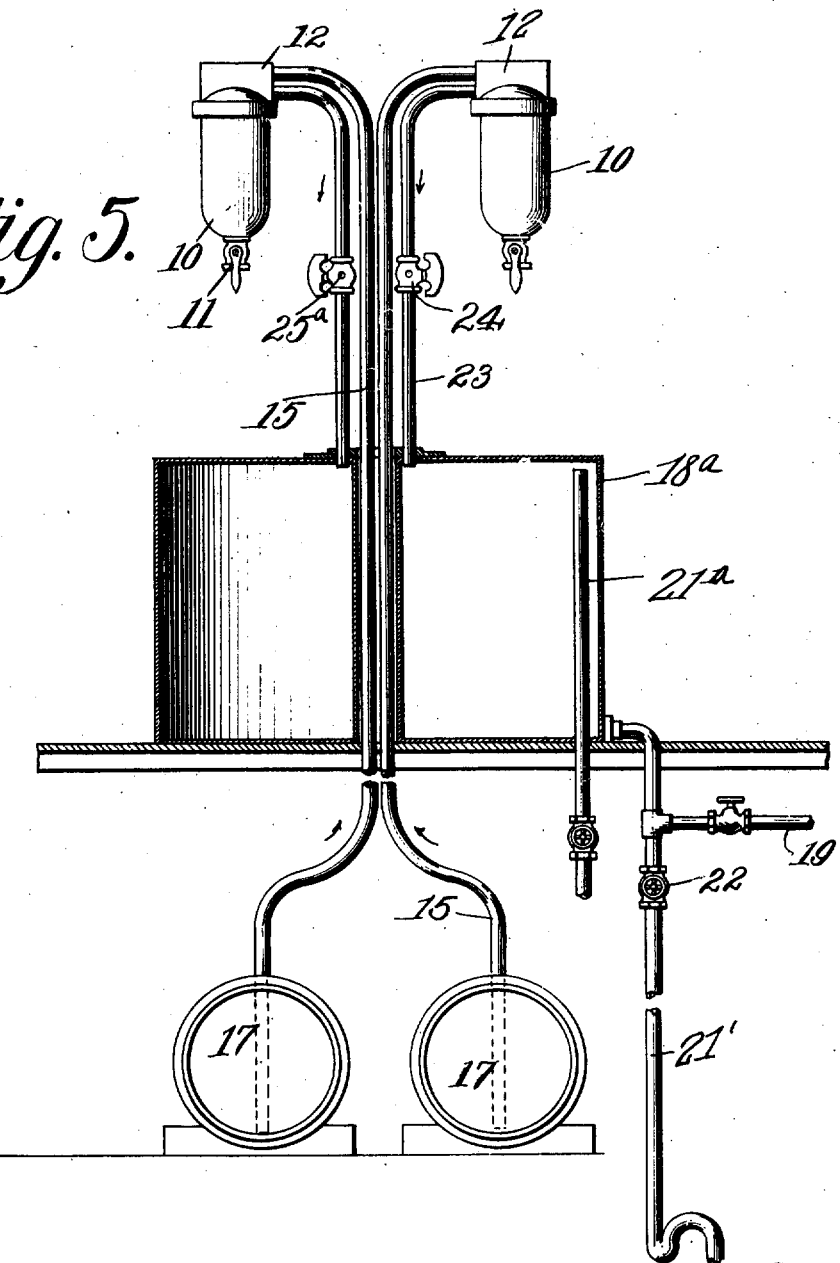

JOHN J. TOKHEIM, OF CEDAR RAPIDS, IOWA.

LIQUID DRAWING AND MEASURING APPARATUS.

No. 903,244.      Specification of Letters Patent.      Patented Nov. 10, 1908.

Application filed December 11, 1907. Serial No. 406,064.

*To all whom it may concern:*

Be it known that I, JOHN J. TOKHEIM, a citizen of the United States, residing at Cedar Rapids, in the county of Linn and State of Iowa, have invented a new and useful Liquid Drawing and Measuring Apparatus, of which the following is a specification.

This invention relates to apparatus for drawing and measuring liquids, and is especially adapted for the handling of such liquids as water, oil, vinegar, alcohol, whisky, turpentine, etc.

The principal object of the invention is to provide an apparatus in which the liquid is drawn from a barrel or other reservoir into a measuring vessel or tank by exhausting the air from the latter, so that the measuring vessel or tank may be placed at a higher elevation than the barrel.

A still further object of the invention is to provide an apparatus of this type that is especially adapted for use in grocery stores or saloons for dispensing vinegar, alcohol, whisky, or other liquids, where the barrels or other reservoirs are placed in the cellar and the measuring vessel is arranged in the store.

A still further object of the invention is to provide an apparatus of this class in which the liquid to be measured is siphoned from the barrel or other reservoir into the measuring vessel.

A still further object of the invention is to provide a liquid measuring apparatus including a measuring tank in which a vacuum or partial vacuum is produced by connecting the measuring vessel to a tank containing water or other liquid which in draining from the tank will draw the air from the measuring vessel.

A still further object of the invention is to provide a liquid measuring apparatus in which all overflow is positively prevented, so that when the measuring vessel is full, the flow of liquid will automatically cease.

A still further object of the invention is to provide an apparatus of this type in which the flow into the measuring vessel may be instantly stopped at any time, so that a vessel having a cubic content of one gallon may be partially filled in order to measure a quart or other fractional part of a gallon with the utmost accuracy.

A still further object of the invention is to provide an apparatus of this type in which all of the liquid in the supply pipe instantly drains back to the barrel or other supply reservoir as soon as the flow stops, this being particularly advantageous when handling gasolene, whisky or other volatile liquids, which would prove a source of danger in case of breakage of the supply pipe.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional elevation of a liquid drawing and measuring apparatus constructed in accordance with the invention. Fig. 2 is a similar view illustrating a slightly modified arrangement. Fig. 3 is a detail sectional view on an enlarged scale through the upper portion of the measuring vessel. Fig. 4 is a detail sectional view of the main controlling valve. Fig. 5 is a sectional elevation illustrating a structure in which a single waste liquid tank is employed in connection with a plurality of measuring vessels.

Similar numerals of reference are employed to indicate corresponding parts throughout the several figures of the drawings.

The measuring chamber or vessel 10 may be located at any convenient point and made of any material, although it is preferably constructed of glass, in order that the contents may be exposed, and the outer face of the vessel is etched in order to indicate the quantity of liquid contained therein, and in some cases to indicate both the quantity and value. At the bottom of the vessel is a discharge cock 11, under which the pitcher, bottle, or other vessel is placed to receive the liquid, or to which a hose may be connected for the purpose of conducting the liquid to any containing vessel, as, for instance, the supply tank of an automobile.

At the top of the vessel is a cover 12, that is fitted very tightly in place in order to prevent the entrance of air, and extending through the cover, or otherwise connected thereto, is a supply pipe 15, the inner end of which discharges into a short section of pipe 15' that depends within the measuring vessel to any desired extent, and which may be adjusted vertically for the purpose of standardizing the vessel. The pipe 15 communicates with the supply reservoir 17, which, in the present instance, is shown in the form of a barrel and which may be placed in a cellar or basement, or any other point below the measuring vessel.

Arranged at any convenient point is an air tight tank 18, which is connected to a water supply pipe 19, having a controlling valve 20, and at the upper portion of the tank is an air cock 21 which may be opened in order to allow the air to escape from the tank when the valve 20 is open for the purpose of filling the tank with water. From the lower portion of the tank leads a pipe 21', having a valve 22, and the bottom of the pipe discharges into a sewer, or at any other convenient point below the level of the reservoir 17. When, however, the tank 18 is placed at a sufficient height above the measuring vessel, it is not necessary that the point of discharge should be below the level of the reservoir 17.

Leading from the cover 12 of the measuring vessel is a pipe 23, the lower end of which connects with the upper portion of the water tank 18, and in said pipe is arranged a controlling valve 24 which is moved to open position each time the apparatus is to be used. This valve 24 is provided with an air port 25ª which, when the valve is turned for the purpose of closing communication between the measuring vessel and the tank, will place the upper portion of the pipe and the measuring vessel in communication with the outer air in order to break the vacuum in the measuring vessel and allow the contents thereof to be discharged through the lower drain cock 11.

In the duct through which the pipe 23 communicates with the measuring vessel is screwed a valve cage 25, having a seat 27 for a float valve 26, and when the vessel is filled with liquid, the ball will float to its seat, thus preventing the flow of any of the contents of the measuring vessel through into the water tank.

In operation, the valve 22 is closed and the valves 20 and 21 are opened, in order to fill the tank 18 with water, after which the valves 20 and 21 are closed and the valve 22 is opened, but the water cannot flow out of the tank so long as the controlling valve 24 is in closed position. The lower end of the pipe 15 is connected to the barrel or other reservoir 17, and the apparatus is then ready for use. On opening the valve 24, a portion of the liquid in the tank 18 will flow out, thus producing a partial vacuum in the measuring vessel 10 and the pipe 23, which results in the up-flow of the vinegar, or other liquid from the barrel 17 through the pipe 15, and into the measuring vessel. As soon as the valve 24 is closed, the flow stops and a pint, quart, or other quantity of liquid may be drawn into the vessel and measured with the utmost accuracy. As soon as the valve 24 is moved to closed position, the air port 25ª is placed in communication with the upper portion of the pipe 23, and air rushes in through the pipe to the upper portion of the measuring vessel, thus breaking the vacuum, restoring the air pressure to normal, so that the liquid in the upper portion of the measuring chamber and in the supply pipe 15 will instantly start to flow back by gravity into the barrel 17, and continues until the lower end of the pipe 15' is uncovered, whereupon the siphoning action will cease. As soon as the air pressure in the upper portion of the measuring vessel has been restored to that of the atmosphere, the drain or discharge cock 11 may be opened, and the liquid drawn from the measuring receptacle into any suitable vessel or reservoir.

The measuring vessel will usually be made to hold a gallon or other predetermined quantity, and when this quantity has been supplied to the vessel, the ball valve 26 will float on the liquid to a position against the seat 27, thus stopping the flow through the pipe 23 in case the attendant neglects to turn the valve 24, so that no liquid can be wasted by passing through the pipe 23 to the water tank.

In the construction shown in Fig. 2, the two pipes 15 and 23 both extend out at the same side of the cover of the measuring vessel and form a support for the vessel, so that the entire lower portion of the vessel is free to permit the introduction of any receiving vessel.

In Fig. 2, the water tank 18' is shown as elevated, but the connections are the same as described with reference to Fig. 1, although the siphon action will occur somewhat more quickly owing to the greater head of the water. An air vent pipe 16 is connected with the tank 18' and operates in the same manner as the pet cock 21 in Fig. 1.

Where the tank 18' is located at some distance above the level of the measuring vessel, the stream of waste liquid descends with such force that it will not be necessary to locate the discharge at a point below the level of the containing reservoir 17, although this is preferred where circumstances permit.

In the construction shown in Fig. 5, a single waste liquid tank 18ª is employed in connection with a number of measuring vessels 10.

Each measuring vessel is connected through a lift pipe 15 with its separate reservoir 17, and all of the descending legs or pipes 23 are connected to the waste tank 18ᵃ and this tank serves as a base or support for the series of measuring vessels, so that the latter may be arranged in a cluster above the central portion of the tank, while the latter will act as a base or table for the support of the vessels into which the liquid is to be finally discharged. In this case the air vent is shown in the form of a valved pipe 21ᵃ, the top of which communicates with the upper portion of the tank, although a simple pet cock may be employed as shown in Fig. 1.

It will be noted on reference to Fig. 3, that the short section of pipe 15′ is threaded, so that it may be vertically adjusted within the duct or port into which the pipe 15 leads, thus to standardize the measuring chamber.

It is obvious that the device may be used for the drawing of liquids where accurate measurement is not necessary, thus for instance, in the drawing of syrups or flavoring extracts for soda water and the like.

The apparatus may, also, be employed in measuring and dispensing acids and any other substance in liquid form.

I claim:—

1. In a liquid measurer, a siphon embodying a liquid measuring vessel and a pair of legs, the upper ends of which are connected with the upper portion of the vessel.

2. In a liquid measurer, a siphon embodying a liquid measuring vessel and a pair of legs, the upper ends of which are connected with the upper portion of the vessel, and means for standardizing the vessel.

3. In a liquid measurer, a siphon embodying a liquid measuring vessel and a pair of legs the upper ends of which are connected with the upper portion of the vessel, a liquid reservoir connected with the ascending leg of the siphon, and a waste liquid discharge connected with the descending leg of the siphon.

4. In a liquid measurer, a siphon embodying a liquid measuring vessel and a pair of legs, the upper ends of which are connected with the upper portion of the vessel, a liquid reservoir connected with the ascending leg of the siphon, a waste liquid discharge connected with the descending leg of the siphon, and means for controlling the flow of the waste liquid.

5. In a liquid measurer, a siphon embodying a liquid measuring vessel and a pair of legs, the upper ends of which are connected with the upper portion of the vessel, a liquid reservoir in communication with the ascending leg of the siphon and from which liquid is drawn into the measuring vessel, a waste liquid reservoir in communication with the descending leg of the siphon, and means for controlling the flow of the waste liquid whereby to create a partial vacuum in the measuring chamber.

6. In a liquid measurer, a siphon embodying a liquid measuring vessel and a pair of legs, the upper ends of which are connected with the upper portion of the vessel, a liquid reservoir in communication with the ascending leg of the siphon, a waste liquid reservoir in communication with the descending leg of the siphon, and means in the latter leg for breaking the vacuum in the vessel to permit the return of the liquid in the ascending leg back to the reservoir.

7. In a liquid measurer, a siphon embodying a liquid measuring vessel and a pair of legs, the upper ends of which are connected with the upper portion of the vessel, a liquid reservoir in communication with the ascending leg of the siphon and from which liquid is drawn into the measuring vessel, means for withdrawing the liquid from the measuring vessel, a waste liquid reservoir in communication with the descending leg of the siphon, and means in the latter leg for breaking the vacuum in the siphon and in the measuring vessel to permit the descent of the column of liquid in the ascending leg of the siphon and the withdrawal of the liquid from the measuring vessel.

8. In a liquid measurer, a siphon embodying a liquid measuring vessel and a pair of legs, the upper ends of which are connected with the upper portion of the vessel, means for withdrawing liquid from the vessel, a liquid reservoir in communication with the ascending leg of the siphon and from which liquid is drawn into the measuring vessel, a float valve arranged in the vessel to float on the liquid therein to a position to close communication between the vessel and the descending leg of the siphon, a waste liquid reservoir in communication with the descending leg of the siphon, and means in the latter leg for breaking the vacuum in the siphon and the measuring vessel to permit the descent of the column of liquid in the ascending leg of the siphon to the reservoir and the withdrawal of the liquid from the measuring vessel.

9. In combination, a liquid measuring vessel, a liquid containing reservoir arranged below said vessel, a connecting pipe between the reservoir and vessel and communicating with the upper portion of the latter, a suction pipe leading from the upper portion of the vessel and through which air is withdrawn to create a partial vacuum in the vessel, a valve cage hung from the mouth of the suction pipe, a float valve arranged in said cage and arranged to close said pipe when the vessel is filled, means for inducing the flow of air through said pipe, and means for breaking the vacuum in the pipe and measuring vessel.

10. In apparatus of the class described, a liquid reservoir, a measuring vessel arranged above said reservoir, an intake pipe leading from the reservoir to the vessel, means for standardizing the cubic contents of the measuring vessel, and means for creating a partial vacuum in the vessel thereby to induce the flow of liquid from the reservoir into said vessel.

11. In apparatus of the class described, a liquid reservoir, a measuring vessel arranged above said reservoir, an intake pipe leading from the reservoir to the upper portion of the vessel, a member through which the liquid flows from the pipe into the vessel, said member being adjustable to standardize the capacity of the vessel, and means for creating a partial vacuum within said vessel.

12. In apparatus of the class described, a liquid reservoir, a measuring vessel arranged above said reservoir, an intake pipe leading from the reservoir to the top of said vessel, a threaded tube through which the liquid flows from the pipe into the vessel, said tube being adjustable to standardize the capacity of the vessel, and means for creating a partial vacuum within said vessel.

13. In apparatus of the class described, a plurality of measuring vessels, a plurality of reservoirs each having an independent connection with one of the vessels, a waste liquid tank having a discharge port, and connections extending between all of the measuring vessels and the tank.

14. In apparatus of the class described, a plurality of receiving vessels, a plurality of reservoirs, up take pipes independently connecting the reservoirs to said vessels, a waste liquid tank, a plurality of valved connections extending between the receiving vessels and the tank, and a discharge pipe leading from said tank.

15. A liquid measurer comprising a plurality of liquid reservoirs, a waste liquid tank having a single discharge leg, a plurality of liquid receiving vessels arranged above the reservoirs, a plurality of ascending legs leading from the reservoirs to said vessels, a plurality of descending legs leading from the vessels to the tank, and controlling valves in said descending legs.

In testimony that I claim the foregoing as my own, I have hereto affixed my signature in the presence of two witnesses.

JOHN J. TOKHEIM.

Witnesses:
O. J. FELTON,
E. H. SPENCER.